US00RE43647E

(19) United States
(12) Reissued Patent
Reitmeier et al.

(10) Patent Number: US RE43,647 E
(45) Date of Reissued Patent: *Sep. 11, 2012

(54) REGION-BASED INFORMATION COMPACTION AS FOR DIGITAL IMAGES

(75) Inventors: Glenn Arthur Reitmeier, Morrisville, PA (US); Michael Tinker, Morrisville, PA (US)

(73) Assignee: Akikaze Technologies, LLC, Wilmington, DE (US)

( * ) Notice: This patent is subject to a terminal disclaimer.

(21) Appl. No.: 12/841,862

(22) Filed: Jul. 22, 2010

Related U.S. Patent Documents

Reissue of:
(64) Patent No.: 7,403,565
Issued: Jul. 22, 2008
Appl. No.: 10/429,985
Filed: May 6, 2003

U.S. Applications:
(63) Continuation of application No. 09/292,693, filed on Apr. 15, 1999, now Pat. No. 6,560,285, which is a continuation-in-part of application No. 09/050,304, filed on Mar. 30, 1998, now Pat. No. 6,118,820.

(51) Int. Cl.
*H04N 7/12* (2006.01)

(52) U.S. Cl. ..... 375/240.16; 375/240.01; 375/240.12; 375/E7.081; 375/E7.205; 375/E7.272

(58) Field of Classification Search ..... 375/240, 375/240.01, 240.12, 240.16, 240.24, 240.27, 375/E7.081, E7.205, E7.272; 382/233; 386/227
See application file for complete search history.

(56) References Cited

U.S. PATENT DOCUMENTS

| | | | | |
|---|---|---|---|---|
| 4,845,560 | A | 7/1989 | Kondo et al. | |
| 4,947,447 | A | 8/1990 | Miyaoka et al. | |
| 4,982,290 | A * | 1/1991 | Nishi et al. | 386/227 |
| 5,023,710 | A | 6/1991 | Kondo et al. | |
| 5,049,990 | A * | 9/1991 | Kondo et al. | 375/240.24 |
| 5,070,402 | A | 12/1991 | Ishii et al. | |
| 5,121,205 | A | 6/1992 | Ng et al. | |
| 5,307,177 | A | 4/1994 | Shibata et al. | |
| 5,374,958 | A | 12/1994 | Yanagihara | |
| 5,392,072 | A | 2/1995 | Rodriguez et al. | |

(Continued)

FOREIGN PATENT DOCUMENTS

EP 0 630 158 12/1994

(Continued)

OTHER PUBLICATIONS

U.S. Appl. No. 11/635,063, filed Dec. 7, 2006, Tinker et al.

(Continued)

*Primary Examiner* — Allen Wong
(74) *Attorney, Agent, or Firm* — Woodcock Washburn LLP

(57) ABSTRACT

A method and apparatus for preserving the dynamic range of a relatively high dynamic range information stream, illustratively a high resolution video signal, subjected to a relatively low dynamic range encoding and/or transport process(es). A relatively high dynamic range information stream is subjected to a segmentation and remapping process whereby each segment is remapped to the relatively low dynamic range appropriate to the encoding and/or transport process(es) utilized. An auxiliary information stream includes segment and associated remapping information such that the initial, relatively high dynamic range information stream may be recovered in a post-encoding (i.e. decoding) or post-transport (i.e., receiving) process.

31 Claims, 4 Drawing Sheets

U.S. PATENT DOCUMENTS

| | | | | |
|---|---|---|---|---|
| 5,412,428 | A | | 5/1995 | Tahara |
| 5,486,929 | A | | 1/1996 | Heyl |
| 5,497,246 | A | | 3/1996 | Abe |
| 5,526,131 | A | | 6/1996 | Strolle et al. |
| 5,541,739 | A | | 7/1996 | Tanaka |
| 5,589,993 | A | | 12/1996 | Naimpally |
| 5,610,998 | A | | 3/1997 | Kondo |
| 5,612,748 | A | | 3/1997 | Gohshi et al. |
| 5,757,855 | A | | 5/1998 | Strolle et al. |
| 5,764,805 | A | | 6/1998 | Martucci et al. |
| 5,790,206 | A | | 8/1998 | Ju |
| 5,809,175 | A | | 9/1998 | Kondo |
| 5,848,220 | A | | 12/1998 | Henmi et al. |
| 5,995,668 | A | * | 11/1999 | Corset et al. ..... 382/233 |
| 6,025,878 | A | | 2/2000 | Boyce et al. |
| 6,037,984 | A | | 3/2000 | Isnardi et al. |
| 6,040,867 | A | * | 3/2000 | Bando et al. ..... 375/240.27 |
| 6,084,908 | A | | 7/2000 | Chiang et al. |
| 6,084,912 | A | | 7/2000 | Reitmeier et al. |
| 6,118,820 | A | | 9/2000 | Reitmeier et al. |
| 6,125,146 | A | | 9/2000 | Frencken et al. |
| 6,208,745 | B1 | | 3/2001 | Florencio et al. |
| 6,560,285 | B1 | | 5/2003 | Reitmeier et al. |
| 6,829,301 | B1 | | 12/2004 | Tinker et al. |
| 7,403,565 | B2 | | 7/2008 | Reitmeier et al. |

FOREIGN PATENT DOCUMENTS

| | | | |
|---|---|---|---|
| EP | 0 649 261 | A2 | 4/1995 |
| EP | 0 649 261 | A3 | 4/1995 |
| EP | 0 630 158 | | 5/1999 |
| EP | 0 649 261 | | 1/2002 |
| EP | 1 050 167 | | 12/2008 |
| JP | 4-185172 | A | 7/1992 |
| WO | WO 97/17669 | | 5/1997 |
| WO | WO 97/17669 | A1 | 5/1997 |
| WO | WO 97/47139 | | 12/1997 |
| WO | WO 99/37096 | | 7/1999 |
| WO | WO 99/37097 | | 7/1999 |
| WO | WO 99/37097 | A1 | 7/1999 |
| WO | WO 00/64185 | | 10/2000 |
| WO | WO 00/64185 | A1 | 10/2000 |

OTHER PUBLICATIONS

Chen, et al.: "Coding of Subregions Content-Based Scalable Video": IEEE Transactions on Circuits and Systems for Video Technology, 7(1), Feb. 1, 1997, pp. 256-260.

PCT International Search Report dated Apr. 16, 1999 in corresponding International Application No. PCT/US99/00351.

PCT International Search Report dated Apr. 16, 1999 in corresponding International Application No. PCT/US99/00352.

EP Communication issued by the Examining Division on May 30, 2003 from corresponding EP Application No. EP99902105.8.

EP Communication issued by the Examining Division on Apr. 20, 2004 from corresponding EP Application No. EP99902105.8.

PCT International Preliminary Examination Report dated Jun. 6, 2000 from corresponding International Application No. PCT/US99/00352.

Chen, T. et al.: "Coding of Subregions Content-Based Scalable Video": IEEE Transactions on Circuits and Systems for Video Technology, vol. 7, No. 1, Feb. 1997, pp. 256-260, XP000678899; see p. 258, paragraph IV.A; figure 4.

PCT International Search Report, dated Apr. 16, 1999, for International Patent Application No. PCT/US99/00351, 3 pgs.

* cited by examiner

REGION-BASED INFORMATION COMPACTION AS FOR DIGITAL IMAGES

Matter enclosed in heavy brackets [ ] appears in the original patent but forms no part of this reissue specification; matter printed in italics indicates the additions made by reissue.

This application is a *reissue application of U.S. patent application Ser. No. 10,429,985, filed May 6, 2003, now patented as U.S. Pat. No. 7,403,565, which is a* continuation of U.S. patent application Ser. No. 09/292,693, filed Apr. 15, 1999 now U.S. Pat. No. 6,560,285, which is a continuation in part of U.S. patent application Ser. No. 09/050,304, filed on Mar. 30, 1998 now U.S. Pat. No. 6,118,820 for Region-Based Information Compaction as for Digital Images, which are herein incorporated by reference in their entirety.

The invention relates to information processing systems in general, and, more particularly, the invention relates to a method and apparatus for preserving a relatively high dynamic range of an information signal, such as a video information signal, processed via a relatively low dynamic range information processing system.

BACKGROUND OF THE DISCLOSURE

In some communications systems the data to be transmitted is compressed so that the available bandwidth is used more efficiently. For example, the Moving Pictures Experts Group (MPEG) has promulgated several standards relating to the compression of moving images and digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Within respect to still images (or single image frames), several well known standards are utilized to effect compression of image information. For example, the Joint Photographic Experts Group (JPEG) has promulgated a several standard relating to the compression of still images, most notably the ISO/IEC 10918-1 (ITU-T T.81) standard, which is the first of a multi-part set of standards for still image compression.

In the context of digital video processing and digital image processing, information such as pixel intensity and pixel color depth of a digital image is encoded as a binary integer between 0 and $2^{n-1}$. For example, film makers and television studios typically utilize video information having 10-bit pixel intensity and pixel color depth, which produces luminance and chrominance values of between zero and 1023. While the 10-bit dynamic range of the video information may be preserved on film and in the studio, the above-referenced standards (and communication systems adapted to those standards) typically utilize a dynamic range of only 8-bits. Thus, the quality of a film, video or other information source provided to an ultimate information consumer is degraded by dynamic range constraints of the information encoding methodologies and communication networks used to provide such information to a consumer.

Therefore, it is seen to be desirable to provide a method and apparatus to preserve the dynamic range of film, video and other forms of relatively high dynamic range information that are encoded and transported according to relatively low dynamic range techniques. Moreover, it is seen to be desirable to provide such dynamic range preservation while utilizing economies of scale inherent to these relatively low dynamic range techniques, such as the above-referenced MPEG-like standards and techniques.

SUMMARY OF THE INVENTION

The invention comprises a method and apparatus for preserving the dynamic range of a relatively high dynamic range information stream, illustratively a high resolution video signal, subjected to a relatively low dynamic range encoding and/or transport process(es). The invention subjects the relatively high dynamic range information stream to a segmentation and remapping process whereby each segment is remapped to the relatively low dynamic range appropriate to the encoding and/or transport process(es) utilized. An auxiliary information stream includes segment and associated remapping information such that the initial, relatively high dynamic range information stream may be recovered in a post-encoding (i.e. decoding) or post-transport (i.e., receiving) process.

Specifically, a method for encoding an information frame according to the invention comprises the steps of: dividing the information frame into a plurality of information regions, at least one of the information regions comprising at least one information parameter having associated with it a plurality of intra-region values bounded by upper and lower value limits defining a dynamic range of the information parameter; determining, for each of the at least one information region, a respective maximal value and a minimal value of the at least one information parameter; remapping, for each of the at least one information regions and according to the respective determined maximal and minimal values, the respective plurality of intra-region values of the at least one information parameter; and encoding each information region.

BRIEF DESCRIPTION OF THE DRAWING

The teachings of the present invention can be readily understood by considering the following detailed description in conjunction with the accompanying figures, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which relatively high dynamic range information is subjected to relatively low dynamic range processing (e.g., encoding), and subsequently reprocessed (e.g., decoded) to reproduce, ideally, the original high dynamic range information or an approximation thereto.

While the invention will primarily be discussed within the context of multiple or moving image processed (e.g., MPEG-like video processing), it will be appreciated by those skilled in the art that the teachings of the present invention are readily applicable to single or still image processing (e.g., JPEG-like image processing). More generally, the teachings of the present invention are applicable to any form of information comprising one or more information parameters having associated with them a relatively high dynamic range. The invention provides the capability to reduce that dynamic range for, e.g., processing or transport, and subsequently restore that dynamic range.

Figure 1:
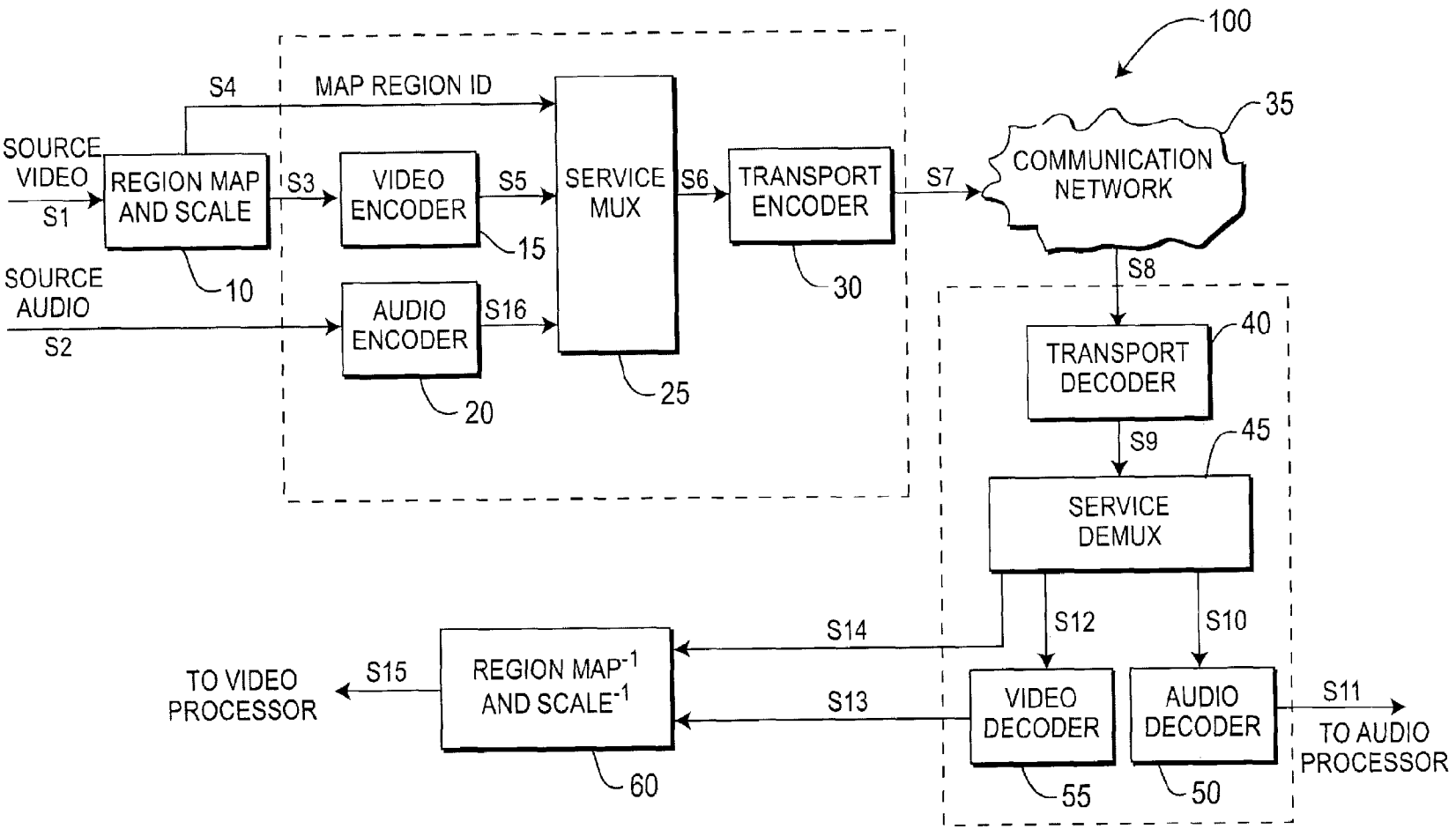
FIG. 1 depicts an information distribution system.

FIG. 1 depicts an information distribution system 100 that encodes, illustratively, a 10-bit dynamic range information stream using a pre-processing function to produce a range enhancement information stream, and an 8-bit encoding process, illustratively an MPEG-like encoding process, to produce an 8-bit encoded information stream. The 8-bit encoded information stream and the range enhancement information stream are transported to, e.g., a receiver. At the receiver, the 8-bit encoded information stream is subjected to a decoding process, illustratively an MPEG-like decoding process, to produce an 8-bit decoded information stream. A post-processing function utilizes the range enhancement information stream to enhance the dynamic range of the 8-bit decoded information stream such that the original 10-bit dynamic range is substantially restored.

The system 100 of FIG. 1 comprises an information coding section (10-30) suitable for use by, illustratively, an information provider such as a television studio; an information distribution section (35), illustratively a communication channel such as a terrestrial broadcast channel; and an information decoding section (40-60), suitable for use by, illustratively, an information consumer having an appropriate decoding device.

The information coding section comprises a region map and scale unit 10 that receives a relatively high dynamic range information signal S1, illustratively a 10-bit dynamic range video signal, from an information source such as a video source (not shown). The region map and scale unit 10 divides each picture-representative, frame-representative or field-representative portion of the 10-bit video signal S1 into a plurality of, respectively, sub-picture regions, sub-frame regions or sub-field regions. The operation of region map and scale unit 10 will be described in more detail below with respect to FIG. 2. Briefly, each of the plurality of regions are processed to identify, illustratively, a maximum luminance level ($Y_{max}$) and a minimum luminance level ($Y_{min}$) utilized by pixels within the processed region. The luminance information within each region is then scaled (i.e., remapped) from the original 10-bit dynamic range (i.e., 0 to 1023) to an 8-bit dynamic range having upper and lower limits corresponding to the identified minimum luminance level ($Y_{min}$) and maximum luminance level ($Y_{max}$) of the respective region to produce, at an output, an 8-bit baseband video signal S3. The maximum and minimum values associated with each region, and information identifying the region, are coupled to an output as a map region ID signal S4. In the case of, e.g., a region not requiring dynamic range compaction, the map region ID signal may comprise an empty set.

An encoder 15, illustratively an MPEG-like video encoder (or JPEG-like image encoder), receives the remapped, 8-bit baseband video (or image) signal S3 from the region map and scale unit 10. The encoder 15 encodes the 8-bit baseband video signal to produce a compressed video signal S5, illustratively an MPEG-like video elementary stream.

An audio encoder 20, illustratively an MPEG-like audio encoder, receives a baseband audio signal S2 from an audio source (not shown). The baseband audio signal S2 is, typically, temporally related to the baseband video signal S3. The audio encoder 20 encodes the baseband audio signal to produce a compressed audio signal S16, illustratively an MPEG-like audio elementary stream. It must be noted that audio encoder 20, and other audio functionality to be described later, is not strictly necessary to the practice of the invention.

A service multiplexer 25 wraps the map region ID signal S4, the elementary stream S5 and the audio elementary stream S16 into respective variable-length or fixed length packet structures known as packetized elementary streams. The packetized elementary streams (PES) are combined to form a multiplexed PES S6. The PES structure provides, e.g., functionality for identification and synchronization of decoding and presentation of the video, audio and other information. A transport encoder 30 converts the PES packets of multiplexed PES S6 into fixed-length transport packets in a known manner to produce a transport stream S7.

It should be noted that the map region ID signal S4 may be communicated to an end user (e.g., a decoder) via a plurality of means within the context of, e.g., the various communications standards. User private data tables and private data or message descriptors incorporating the map region ID signal S4 may be placed in designated locations throughout messages as described in the MPEG and ATSC standards. The use of such data, and other MPEG, ATSC, DVB and similar private, user or auxiliary data communication formats is contemplated by the inventors. For example, since the map region ID signal S4 includes information corresponding to encoded region information within the elementary stream S5, in one embodiment of the invention the map region ID signal is included as private data within the multiplexed elementary stream S5.

The map region ID signal S4 may be communicated as an auxiliary data stream, an MPEG-like data stream or a user private data or message stream. Private data may comprise a data stream associated with a particular packet identification (PID), private or user data inserted into, e.g., a payload or header portion of another data stream (e.g., a packetized elementary stream including the elementary stream S5) or other portions of an information stream. In the case of a transport stream, the map region ID signal S4 is optionally incorporated into a transport stream private section.

In one embodiment of the invention, the transport encoder includes, in a private data section of the transport stream being formed, the dynamic range enhancement stream. In another embodiment of the invention, the transport encoder associated the encoded information stream and the associated dynamic range enhancement stream with respective packet identification (PID) values. In another embodiment of the invention, the transport encoder incorporates, into a packetized stream, the encoded information stream. Additionally, the transport encoder includes, within a header portion of the packetized stream incorporating the encoded information stream, the associated dynamic range enhancement stream.

The information distribution section comprises a communications network 35, illustratively a terrestrial broadcast, fiber optic, telecommunications or other public or private data communications network. The communications network receives the transport stream S7 produced by the information coding section; modulates or encodes the transport stream S7 to conform to the requirements of the communications network (e.g., converting the MPEG transport stream S7 into an asynchronous transfer mode (ATM) format); transmits the modulated or encoded transport stream to, e.g., a receiver; and demodulates or decodes the modulated or encoded transport stream to produce an output transport stream S8.

The information decoding section comprises a transport decoder 40 that converts the received transport stream S8 into a multiplexed PES S9. The multiplexed PES S9 is demultiplexed by a service demultiplexer 45 to produce a map region ID signal S14, a video elementary stream S12 and an audio elementary stream S10 corresponding to, respectively, map region ID signal S4, elementary stream S5 and audio elementary stream S16.

The video elementary stream S12 is decoded in a known manner by a video decoder 55 to produce, an 8-bit baseband video signal S13 corresponding to the remapped 8-bit baseband video signal S3. The audio elementary stream S10 is decoded in a known manner by an audio decoder 50 to produce a baseband audio output signal S11, corresponding to the baseband audio signal S2, which is coupled to an audio processor (not shown) for further processing.

An inverse region map and scale unit 60 receives the 8-bit baseband video signal S13 and the map region ID signal S14. The inverse region map and scale unit 60 remaps the 8-bit baseband video signal S13, on a region by region basis, to produce a 10-bit video signal S15 corresponding to the original 10-bit dynamic range video signal S1. The produced 10-bit video signal is coupled to a video processor (not shown) for further processing. The operation of inverse region map and scale unit 60 will be described in more detail below with respect to FIG. 2. Briefly, the inverse region map and scale unit 60 retrieves, from the map region ID signal S14, the previously identified maximum luminance level ($Y_{max}$) and minimum luminance level ($Y_{min}$) associated with each picture, frame or field region, and any identifying information necessary to associate the retrieved maximum and minimum values with a particular region within the 8-bit baseband video signal S13. The luminance information associated with each region is then scaled (i.e., remapped) from the 8-bit dynamic range bounded by the identified minimum luminance level ($Y_{min}$) and maximum luminance level ($Y_{max}$) associated with the region to the original 10-bit (i.e., 0-1023) dynamic range to produce the 10-bit video signal S15. It will be appreciated by those skilled in the art that other high dynamic range parameters associated with an information signal (e.g., chrominance components, high dynamic range audio information and the like) may also be advantageously processed using the apparatus and method of the invention.

As previously noted, the map region ID signal S4 may be communicated to an end user (e.g., a decoder) via a plurality of means within the context of, e.g., the various communications standards. Thus, in one embodiment of the invention, the map region ID signal S4 is recovered from a private data section of said transport stream. In another embodiment of the invention, the map region ID signal is associated with a respective identification (PID) value and recovered using that value. In another embodiment of the invention, the encoded information stream is recovered from a packetized stream associated with a predefined packet identification (PID) value, while the map region ID signal is retrieved form a header portion of the packetized stream associated with the predefined packet identification (PID) value.

Figure 2:
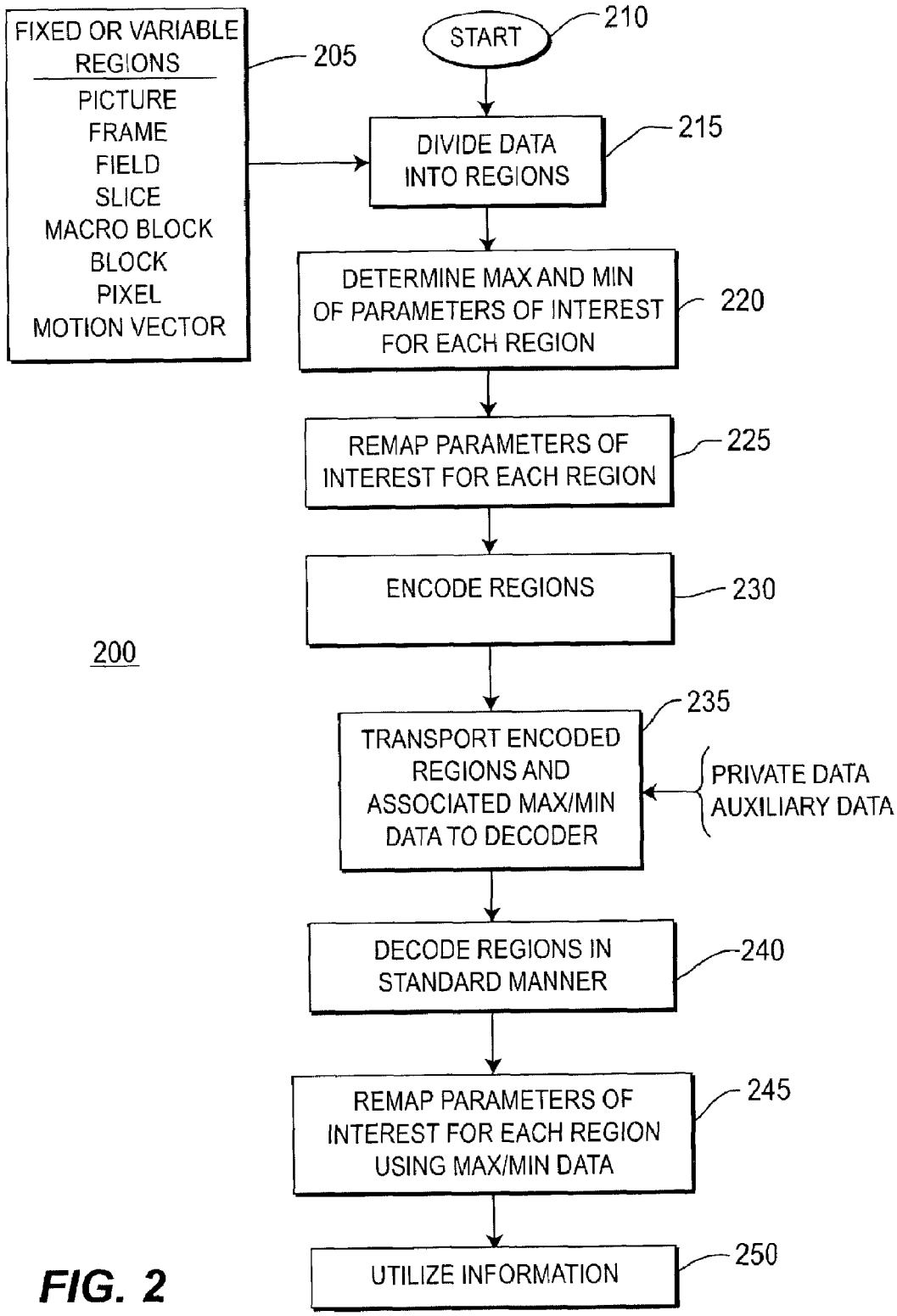
FIG. 2 is a flow diagram of a combined information stream encoding method and decoding method.

FIG. 2 is a flow diagram of a combined information stream encoding method and decoding method. The method 200 is entered at step 210 when a relatively high dynamic range information stream comprising a plurality of logical information frames is received by, e.g., region map and scale unit 10. The method 200 proceeds to step 215, where each logical information frame of the received information stream is divided into regions according to, illustratively, the criteria depicted in box 205 which includes: fixed or variable coordinate regions based on picture, frame, field, slice macroblock, block and pixel location, related motion vector information and the like. In the case of a video information stream, any exemplary region comprises a macroblock region size.

After dividing the logical information frames into regions (step 215) the method 200 proceeds to step 220, where the maximum and minimum values of one or more parameters of interest are determined for each region. In the case of a video information signal, a parameter of interest may comprise a luminance parameter (Y), color difference parameter (U, V), motion vector and the like.

The method 200 then proceeds to step 225, where the parameters of interest in each pixel of each region are remapped to a parameter value range bounded by respective maximum and minimum parameter values. That is, if the parameter of interest of a pixel is a luminance parameter, all the luminance parameters within a particular region are remapped to a range determined by the maximum luminance value and the minimum luminance value within the particular region as previously determined in step 220.

The above described steps of regional division of logical frames, maximum and minimum parameter(s) determination and remapping comprise the steps necessary to generate an information stream and an associated dynamic range enhancements stream. Specifically, dynamic range degradation visited upon the information stream due to a subsequent, relatively low dynamic range processing step (e.g., step 230 below), may be largely corrected by a second, subsequent processing step (e.g., steps 240-245 below). This concept is critical to the understanding of the invention.

After remapping all of the parameters of interest in one or more regions (step 225), the method 200 proceeds to step 230, where the information within the region is encoded, to produce an encoded information stream. In the case of a video information stream, encoding may comprise one of the MPEG-like encoding standards referenced above. The method 200 then proceeds to step 235, where the encoded information stream, maximum and minimum data associated with each region of the encoded information stream, and information sufficient to associate each region with its respective maximum and minimum parameter(s) information are transported to, e.g., a receiver. The method 200 then proceeds to step 240, where the encoded information stream is decoded to produce a decoded information stream.

It is important to note that the dynamic range of the decoded information stream, specifically the dynamic range of the parameters of interest in the decoded information stream, will not exceed the dynamic range of the encoding or processing methodology employed in, e.g., steps 230-235. Thus, in the case of a ten bit dynamic range luminance parameter of a video signal, and MPEG-like encoding and decoding methodology which utilizes an eight bit dynamic range will produce, at the decoder output, a video information stream having only an eight bit dynamic range luminance parameter.

After decoding the transported information stream (step 240), the method 200 proceeds to step 245, where the eight bit dynamic range decoded information stream is remapped on a region by region basis using the respective maximum and minimum values associated with the parameter or parameters of interest in each region. The resulting relatively high dynamic range information stream is then utilized at step 250.

The portions of the above-described method 200 related to regional division and remapping will now be described in more detail below. In addition, the relationship of the invention to information streams in general, and video information streams in particular, will also be described in more detail.

Information streams are typically segmented or framed according to a logical constraint. Each logical segment or frame comprises a plurality information elements, and each information element is typically associated with one or more parameters. In particular, video information streams are typically segmented in terms of a picture, frame or field. The picture, frame or field comprises a plurality of information elements known as picture elements (pixels). Each pixel is associated with parameters such as luminance information and chrominance information. In the case of MPEG-like systems, pixels are grouped into blocks or macroblocks. Pixels, blocks and macroblocks may also have associated with them motion parameters and other parameters. Each of the parameters associated with a pixel, block or macroblock is accurate to the extent that the dynamic range of the information defining the parameter is accurate. Moreover, preservation of the dynamic range of some parameters, such as pixel luminance, is more critical than preservation of the dynamic range of other parameters, such as block motion. As such, degradation of some parameters due to dynamic range constraints may be acceptable, while other parameters should be preserved with as high a fidelity as possible.

In the case of luminance parameters, in an image comprising very light areas (i.e., high intensity values) and very dark areas (i.e., low intensity values), the dynamic range of the luminance information representing the image may be fully utilized. That is, the value of luminance parameters associated with pixels in the image may be between (in a 10-bit dynamic range representation) from zero (black) to 1023 (white). Thus, if the dynamic range of the luminance information representing the image, illustratively a 10-bit studio image, exceeds the dynamic range of an information processing operation used to process the image, illustratively an 8-bit MPEG encoding operation, quantization errors will necessarily degrade the resulting processed image. However, by segmenting the image into smaller regions, the probability that the full 10-bit dynamic range of the luminance information is utilized in a region decreases.

Regions may be selected according to any intra-frame selection criteria. For example, in the case of a video information frame, appropriate criteria include scan lines, regions defined by pixel coordinates, blocks, macroblocks, slices and the like. In general, the smaller the region selected, the greater the probability of preserving the full dynamic range of the information element parameter.

Figure 3A:
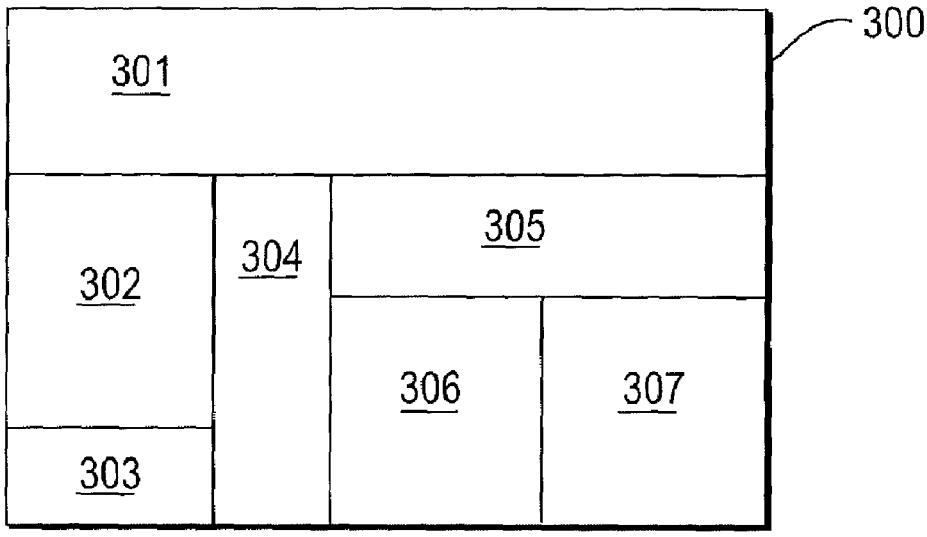
FIG. 3A depicts an image that has been divided into a plurality of regions using a pixel coordinate technique.

FIG. 3A depicts an image 300 that has been divided into a plurality of regions 301-307 using a pixel coordinate technique. In an embodiment of the invention utilizing region partitioning of an image according to FIG. 3A, identifying indicia of region location comprise pixel coordinates defining, e.g., corners or edges of the regions.

Figure 3B:
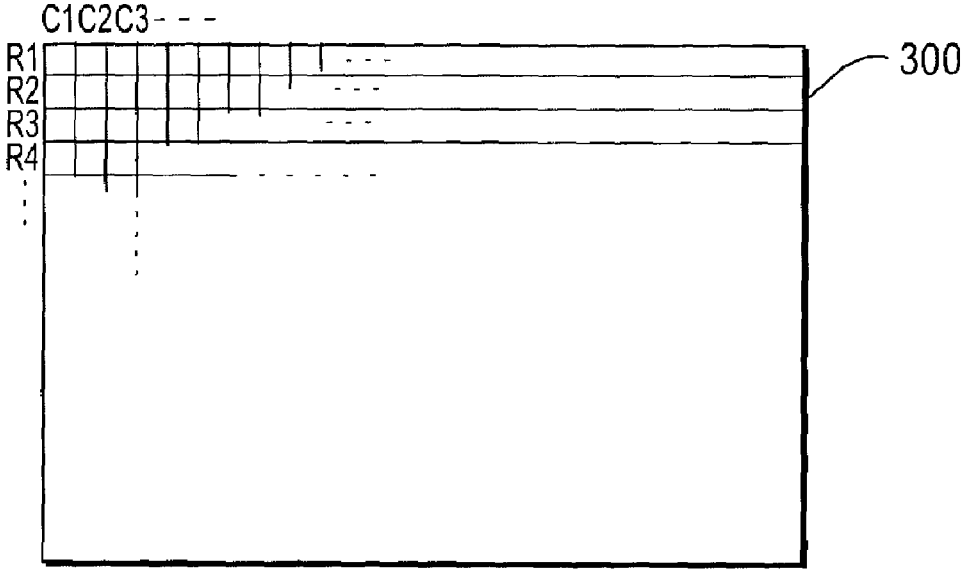
FIG. 3B depicts an image that has been divided into a plurality of single macroblock regions defined by row and column.

FIG. 3B depicts an image 300 that has been divided into a plurality of single macroblock regions defined by row ($R_1$-$R_N$) and column ($C_1$-$C_N$). Since the regions defined in FIG. 3B are much smaller then the regions defined in FIG. 3A, there is a greater probability of preserving the dynamic range of the parameters of interest forming the image. In an embodiment of the invention utilizing region partitioning of an image according to FIG. 3B, identifying indicia of region location comprise macroblock address, as defined by row (i.e., slice) number and column number. A simpler method of region identification comprises identifying each region (i.e., macroblock) by a macroblock offset value representing the number of macroblocks from the start of a picture (i.e., the number of macroblocks from the top left, or first, macroblock).

A simple linear remapping of, e.g., pixel luminance or chrominance parameters from an original dynamic range to a target dynamic range may be represented by equation 1, where TP=Target Pixel; OP=Original Pixel; TR=Target Range; and OR=original Range. In the case of remapping a 10-bit pixel (such as used in a studio) to an 8-bit pixel (such as used in MPEG-like processing systems), equation 1 becomes equation 2. Similarly, in the case of remapping the 8-bit pixel back to a 10-bit pixel equation 1 becomes equation 3. It should be noted that the quantities or results within the floor function operators ⌊ ⌋ are rounded down to the nearest integer value.

$$TP=\lfloor OP*(TR/OR)+0.5\rfloor \quad \text{(eq. 1)}$$

$$TP=\lfloor OP*(256/1024)+0.5\rfloor \quad \text{(eq. 2)}$$

$$TP=\lfloor OP*(1024/256)+0.5\rfloor \quad \text{(eq. 3)}$$

Using equation 2, an OP of 525 will result in a TP of 131. Using equation 3, an OP of 131 will result in a TP of 524. It can be seen that the process of linear remapping from a 10-bit dynamic range to an 8-bit dynamic range and back to the 10-bit dynamic range results in a loss of information due to quantization errors.

The above equations 1-3 mathematically illustrate the quantization error inherent in present remapping functions. By contrast, the below described remapping equations 4 and 5 are suitable for use in, respectively, the region map and scale unit 10 and inverse region map and scale unit 60 of FIG. 1.

In one embodiment of the invention a linear remapping function, such as the exemplary linear remapping function of equation 4, is utilized, where TP=Target Pixel; OP=Original Pixel; TR=Target Range; MAX=maximum parameter value and MIN=minimum parameter value. In the case of a minimum of a 10-bit system having a regional minimum of 400 and a regional maximum of 600, equation 4 becomes equation 5.

$$TP=\lfloor (OP-MIN)*(TR/(MAX-MIN))+0.5\rfloor \quad \text{(eq. 4)}$$

$$TP=\lfloor (OP-400)*(TR/(600-400))+0.5\rfloor \quad \text{(eq. 5)}$$

Within the context of the invention, a function such as equation 4 will be able to preserve the relatively high dynamic range of the original pixel parameter as long as the difference between the maximum and minimum parameter values does not exceed a range defined by the ratio of the original dynamic range and the target dynamic range. That is, in the case of a 10-bit original dynamic range and an 8-bit target dynamic range where the ratio is 1023:255 (i.e., 4:1), the difference between the maximum and minimum values must not be greater than one fourth of the original dynamic range. Thus, a threshold level of dynamic range for each region is established that determines if the full, original dynamic range of the parameter will be preserved by the invention. Since, in equation 5, the difference between the maximum (600) and minimum (400) is less than one fourth of the 10-bit dynamic range (256), full 10-bit dynamic range will be preserved.

It must be noted that equations 4 and 5 should not in any way be construed as limiting the scope of the invention. Rather, equations 4 and 5 are presented as only one of a plurality of linear functions suitable for use in the invention. The invention may also be practiced using non-linear functions (such as gamma correction and companding functions). Moreover, the invention may be practiced using a combination of linear and non-linear functions to optimize data compaction. The linear and/or non-linear functions selected will vary depending on the type of information stream being processed, the typical distribution of parameters of interest within the information elements of that stream, the amount of dynamic range allowed for a given application, the processing constraints of the encoder and/or decoder operating on the information streams and other criteria.

To help ensure that the difference between the maximum and minimum values remains below the threshold level, it is desirable to reduce the size of the regions. However, a reduction in region size necessarily results in additional maximum and minimum information that must be identified and processed, though this overhead may not be significant as will now be demonstrated.

The above-described method advantageously provides substantially full dynamic range preservation of selected information element parameters in an information frame. The cost, in terms of extra bits necessary to implement the invention, e.g., the overhead due to the use of minimum and maximum pixel values for each region of a picture, will now be briefly discussed. Specifically, the additional number of bits to be transported by, e.g., the communications network 35 of FIG. 1 will be discussed.

Consider the case of preserving the 10-bit dynamic range of the luminance parameter of a video information stream processed according to an 8-bit dynamic range process. Assume that a small region size is selected, such as a 16×16 block of 8-bit pixels (monochrome). The 16×16 block of 8-bit pixels is represented by 256*8 bits=2048 bits. Adding two 10-bit values, a minimum and a maximum, to this block increases the number of bits by 20 to 2068 bits, or an increase of about 1%. In return for this, the pixel intensity resolution is never worse than 8 bits, and may be as high as 10 bits, a factor of four improvement in the intensity depth resolution.

Consider the case of a 10-bit digital video stream according to the well known 4:4:4 format. In this case the luminance (Y) and color difference (U, V) signals each have 10-bit dynamic range. Again, assuming that a small region size is selected, such as a 16×16 block of 8-bit pixels. The 8-bit pixels are represented by 256*8*3 bits=6144 bits. In this case also, adding six 10-bit values, a minimum and a maximum for each of the luminance (Y) and color difference (U, V) signals, to this block increases the number of bits by 60 to 6204 bits, or an increase of about 1%. In return for this, each of the luminance (Y) and color difference (U, V) signals are never worse than 8 bits, and may be as high as 10 bits, a factor of four improvement in the respective intensity and color depth resolutions.

Returning now to the first case, if all the pixels were to be represented by 10 bits, then the total number of bits would be 256*10=2560 bits. In other words, full 10-bit representation would require 24% more bits than the regional coding described here. Thus, the method provides a substantial improvement in dynamic range without a correspondingly substantial increase in bit count. Moreover, by utilizing the method within the context of mass-produced encoder/decoder chipsets, such as the various implementations of the MPEG and MPEG-like compression standards, JPEG and JPEG-like compression standards (and other known techniques) the method leverages the cost-savings of existing 8-bit chipsets to provide a 10-bit (or higher) effective dynamic range.

The above-described embodiments of the invention achieve the desired result using linear compaction methods. However, in some applications it is desirable to process information using non-linear methods. For example, analog video signals are non-linearly processed (i.e., "gamma corrected") to compensate for non-linearity in, e.g., picture tubes in television sets. Non-linear mapping methods according to the invention may be used to implement gamma correction and other functions while preserving the dynamic range of the underlying signal. Moreover, linear and non-linear methods may be used together.

Another scenario appropriate for non-linear processing in the mapping function occurs when there is a loss of accuracy because the original range and the target range are too far apart, even with the above-described intensity compaction methods. In this case, non-linear mapping is used to preserve the original pixel values (i.e., dynamic range) over some part of the range. This situation is depicted below with respect to FIGS. 4A and 4B, where the information located within a lower bit range (e.g., 0-131) is illustratively deemed to be more important than the information located within an upper bit range (e.g., 132-1023).

Figure 4A:
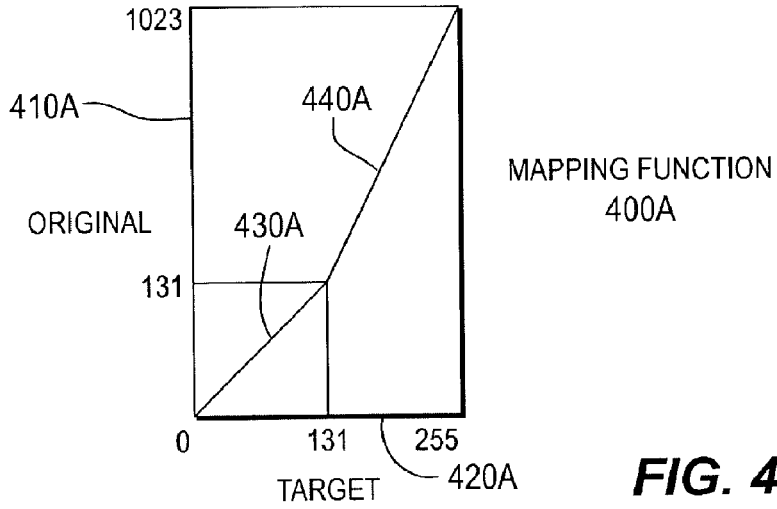
FIG. 4A depicts a diagram illustrative of a non-linear encoding function.

FIG. 4A depicts a diagram 4 illustrative of a non-linear encoding function. The diagram comprises an original dynamic range 410A of 1024 bits and a target dynamic range 420A of 255 bits. A signal 430A, 440A having a 1024 bit dynamic range is remapped into the 255 bit dynamic range space in two segments. The first segment 430A utilizes a substantially linear transfer function, while the second segment 440A utilizes a compressed transfer function. That is, the range of 0-131 in the original map is retained in the target map, while the range of 132 to 1023 in the original map is compressed into the 132-255 range of the target map.

Figure 4B:
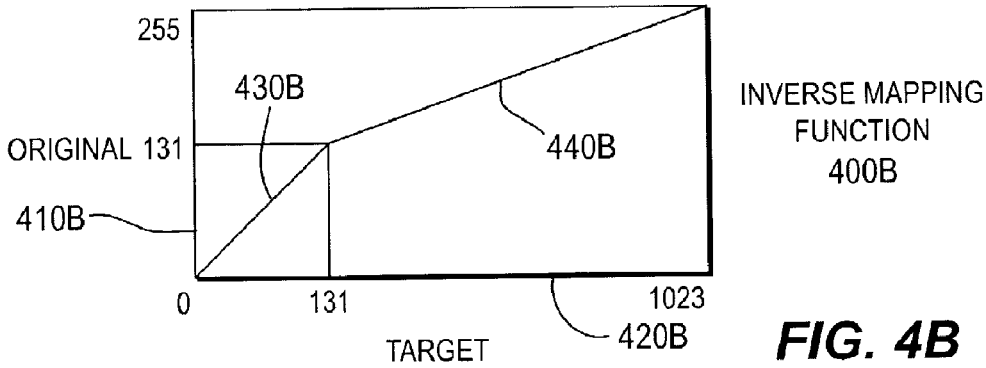
FIG. 4B depicts a diagram illustrative of a non-linear decoding function associated with the encoding function of FIG. 4A.

FIG. 4B depicts a diagram illustrative of a non-linear decoding function associated with the encoding function of FIG. 4A. Thus, to retrieve, at a decoder, the information signal encoded according to a remapping function having the transfer function depicted in FIG. 4A, the decoder implements a remapping function having the transfer function depicted in FIG. 4B.

Figure 5:
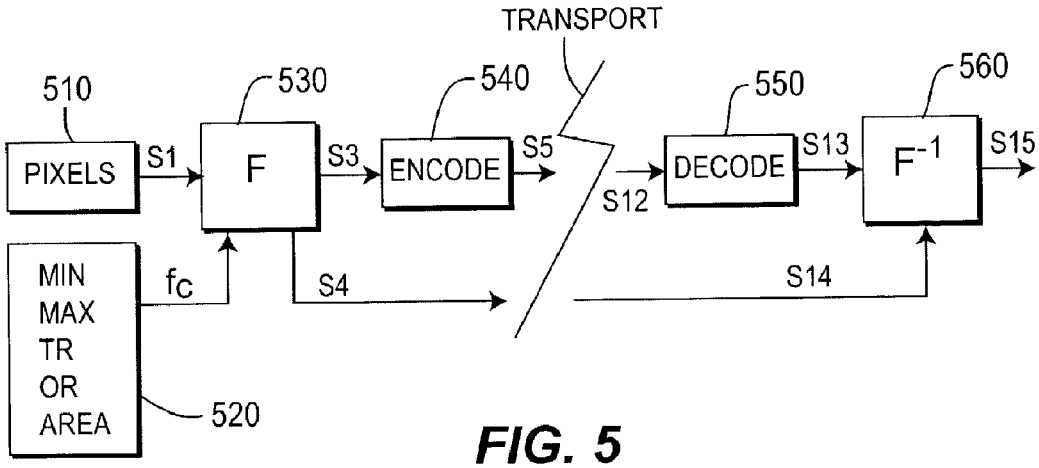
FIG. 5 depicts a high level function block diagram of an encoding and decoding method and apparatus.

FIG. 5 depicts a high level function block diagram of an encoding and decoding method and apparatus according to the invention. Specifically, the encoding and decoding method and process comprises a function mapper 530, which is responsive to an information stream S1 received from, illustratively, a pixel source 510. The function mapper remaps the information stream S1 according to various function criteria $f_c$ provided by a function criteria source 520 to produce a remapped information stream S3 and an associated map information stream S4.

The remapped information stream S3 is coupled to an encoder 540 that encodes the remapped information stream S3 to produce an encoded information stream S5. The encoded information stream S5 and the map information stream S4 are transported to, respectively, a decoder 550 and an inverse function mapper 560.

The decoder 550 decodes the transported and encoded information stream to retrieve an information stream substantially corresponding to the initial remapped information stream.

The inverse function mapper 560 performs, in accordance with the transported map information stream S4, an inverse function mapping operation on the retrieved stream to produce an information stream substantially corresponding to the original information stream. It must be noted that the information stream produced by the inverse function mapper 560 may advantageously include linear and/or non-linear modifications in furtherance of the specific application (e.g., gamma correction and the like).

It should be noted that the function mapper 530 and inverse function mapper 560 may be operated in substantially the same manner as the region map and scale unit 10 and inverse region map and scale unit 60 depicted in FIG. 1.

In one embodiment of the invention, the remapping function performed by, e.g., the function mapper 530 or region map and scale unit 10 performs a remapping function according to an arbitrary function. An arbitrary function remapping of, e.g., pixel luminance or chrominance parameters from an original dynamic range to a target dynamic range may be represented by equation 6, where TP=Target Pixel; OP=Original Pixel; TR=Target Range; OR=original Range; MAX=maximum value; MIN=minimum value; and F=the arbitrary function.

$$TP=F(OP,MAX,MIN,TR) \quad \text{(eq. 6)}$$

It is important to note that the function F may take a number of forms and be implemented in a number of ways. For example, the function F may implement: 1) a simple linear function such as described above with respect to FIGS. 1-2; 2) a gamma correction function that varies input video intensity levels such that they correspond to intensity response levels of a display device; 3) an arbitrary polynomial; or 4) a tabulated function (i.e., a function purely described in terms of a lookup table, where each input bit addresses a table to retrieve the contents stored therein.

In the case of remapping using a fixed gamma correction function, a function of the following form may be implemented:

$$TP=\lfloor F[(OP-MIN)^{\gamma}*TR/(MAX-MIN)^{\gamma}]+0.5\rfloor \quad \text{(eq. 7)}$$

In the case of remapping using a polynomial segment, illustratively a parabola ($X^2+X$), a function of the following form may be implemented, assuming that the polynomial segment is never be less than 0 nor greater than the target range:

$$TP=\lfloor[(OP-MIN)^2+(OP-MIN)*TR/[(MAX-MIN)^2+(MAX-MIN)]+0.5\rfloor \quad \text{(eq. 8)}$$

In the case of remapping using a tabulated function, the table comprises an indexable array of values, where the index values are the original range and the values in the table are included in the target range. This allows any arbitrary mapping between the two ranges. Unless, like gamma correction, that mapping is one-way only (i.e., the remapping is not intended to be "unmapped"), then there an inverse table at the decoder 550 or inverse map and scale unit 60 will restore the original information values.

It should be noted that the terms dynamic range enhancement stream and map region identification stream are used in substantially the same manner to describe information streams carrying auxiliary or other data suitable for use in recovering at least a portion of the dynamic range of an information stream processed according to the invention.

Although various embodiments that incorporate the teachings of the present invention have been shown and described in detail herein, those skilled in the art can readily devise many other varied embodiments that still incorporate these teachings.

What is claimed is:

1. A method for encoding an information frame, comprising [the steps of]:

dividing said information frame into a plurality of information regions, at least one of said information regions comprising at least one information parameter [having] associated with [it] a plurality of intra-region values bounded by upper and lower value limits defining a dynamic range of said information parameter;

determining, for each of said at least one of said information regions, a respective maximal value and a minimal value of said at least one information parameter;

remapping, for each of said at least one of said information regions and according to a single manipulation of the respective determined maximal and minimal values, at least one respective of said plurality of intra-region values of said at least one information parameter; and encoding each of said information regions;

wherein said information frame comprises an image frame and said at least one information parameter comprises at least one of a luminance parameter and a chrominance parameter;

wherein said steps of encoding and determining produce, respectively, an encoded image stream and an associated dynamic range enhancement stream; and wherein said step of remapping is performed in accordance with the following linear equation:

$$TP=[OP*(TR/OR)+0.5]$$

where: TP=Target Pixel; OP=Original Pixel; TR=Target Range; and OR=Original Range.

2. A method for encoding an information frame, comprising [the steps of]:

dividing said information frame into a plurality of information regions, at least one of said information regions comprising at least one information parameter [having] associated with [it] a plurality of intra-region values bounded by upper and lower value limits defining a dynamic range of said information parameter;

determining, for each of said at least one of said information regions, a respective maximal value and a minimal value of said at least one information parameter;

remapping, for each of said at least one of said information regions and according to a single manipulation of the respective determined maximal and minimal values, at least one respective of said plurality of intra-region values of said at least one information parameter; and encoding each of said information regions; wherein said plurality of information frames comprise image frames, said at least one information parameter comprises at least one of a luminance parameter and a chrominance parameter;

wherein said steps of encoding and determining produce, respectively, an encoded image stream and an associated dynamic range enhancement stream;

wherein said steps of dividing, determining, remapping and encoding are repeated for each of a plurality of information frames; and wherein said step of remapping is performed in accordance with the following linear equation:

$$TP=[OP*(TR/OR)+0.5]$$

where: TP=Target Pixel; OP=Original Pixel; TR=Target Range; and OR=Original Range.

3. A method for decoding an encoded information frame represented by a plurality of encoded information regions within an encoded information stream, where at least one of said plurality of encoded information regions comprises at least one information parameter having associated with it a plurality of remapped intra-region values, said method comprising [the steps of]:

decoding each of said plurality of encoded information regions to form a corresponding plurality of decoded information regions, said decoded information regions representing a decoded information frame;

extracting, from a dynamic range enhancement stream associated with said encoded information stream, respective maximal and minimal values for each of said at least one information parameter [having] associated with [it] a plurality of remapped intra-region values;

inverse remapping, according to a single manipulation of said respective maximal and minimal values, each of said at least one information parameter of said at least one information regions having associated with it a respective plurality of remapped intra-region values; and demultiplexing a transport stream to recover said encoded information stream and said dynamic range enhancement stream; wherein said encoded information stream and said dynamic range enhancement stream associated with said encoded information stream comprises respective portions of said transport stream;

wherein said step of demultiplexing comprises retrieving, from a private data section of said transport stream, said dynamic range enhancement stream;

wherein said decoded information frame comprises an image frame and said at least one information parameter comprises at least one of a luminance parameter and a chrominance parameter; and wherein said step of inverse remapping is performed in accordance with the following linear equation:

$$TP=[OP*(TR/OR)+0.5]$$

where: TP=Target Pixel; OP=Original Pixel; TR=Target Range; and OR=Original Range.

4. A method for decoding an encoded information frame represented by a plurality of encoded information regions within an encoded information stream, where at least one of said plurality of encoded information regions comprises at least one information parameter having associated with it a plurality of remapped intra-region values, said method comprising the steps of:

decoding each of said plurality of encoded information regions to form a corresponding plurality of decoded information regions, said decoded information regions representing a decoded information frame;

extracting, from a dynamic range enhancement stream associated with said encoded information stream, respective maximal and minimal values for each of said at least one information parameter [having] associated with [it] a plurality of remapped intra-region values; and inverse remapping, according to a single manipulation of said respective maximal and minimal values, each of said at least one information parameter of said at least one information regions having associated with it a respective plurality of remapped intra-region values;

wherein said steps of decoding, extracting and inverse remapping are repeated for each of a plurality of information frames within said encoded information stream and said dynamic range enhancement stream associated with said encoded information stream;

wherein said decoding step comprises compression decoding said encoded information frame of said information stream; and wherein said step of inverse remapping is performed in accordance with the following linear equation:

$$TP=[OP*(TR/OR)+0.5]$$

where: TP=Target Pixel; OP=Original Pixel; TR=Target Range; and OR=Original Range.

5. An apparatus for decoding an encoded information frame represented by a plurality of encoded information regions within an encoded information stream, where at least one of said plurality of encoded information regions comprises at least one information parameter having associated with it a plurality of remapped intra-region values, said apparatus comprising:

a decoder, for decoding each of said plurality of encoded information regions to form a corresponding plurality of decoded information regions, said decoded information regions representing a decoded information frame; and an inverse map and scale unit, for extracting, from a dynamic range enhancement stream associated with said encoded information stream, respective maximal and minimal values for each of said at least one information parameter [having] associated with [it] a plurality of remapped intra-region values, and for inverse remapping, according to a single manipulation of said respective maximal and minimal values, each of said at least one information parameter of said at least one of said plurality of encoded information regions having associated with it said plurality of remapped intra-region values;

wherein said decoded information frame comprises an image frame and said at least one information parameter comprises at least one of a luminance parameter and a chrominance parameter; and wherein said inverse map and scale unit extracts said respective maximal and minimal values in accordance with the following linear equation:

$$TP=[OP*(TR/OR)+0.5]$$

where: TP=Target Pixel; OP=Original Pixel; TR=Target Range; and OR=Original Range.

6. An apparatus for decoding an encoded information frame represented by a plurality of encoded information regions within an encoded information stream, where at least one of said plurality of encoded information regions comprises at least one information parameter having associated with it a plurality of remapped intra-region values, said apparatus comprising:

a decoder, for decoding each of said plurality of encoded information regions to form a corresponding plurality of decoded information regions, said decoded information regions representing a decoded information frame; and an inverse map and scale unit, for extracting, from a dynamic range enhancement stream associated with said encoded information stream, respective maximal and minimal values for each of said at least one information parameter [having] associated with [it] a plurality of remapped intra-region values, and for inverse remapping, according to a single manipulation of said respective maximal and minimal values, each of said at least one information parameter of said at least one of said plurality of encoded information regions having associated with it said plurality of remapped intra-region values;

wherein said encoded information stream and said dynamic range enhancement stream associated with said encoded information stream represent a plurality of encoded information frames;

wherein said apparatus processes each of said plurality of encoded information frames to produce a corresponding plurality of decoded information frames;

wherein said plurality of decoded information frames comprise image frames and said at least one information parameter comprises at least one of a luminance parameter and a chrominance parameter; and wherein said inverse map and scale unit extracts said respective maximal and minimal values in accordance with the following linear equation:

$$TP=[OP*(TR/OR)+0.5]$$

where: TP=Target Pixel; OP=Original Pixel; TR=Target Range; and OR=Original Range.

7. A method for remapping a value of a parameter of an information element from a first representation system to a second representation system, comprising:

dividing a collection of information elements into regions;

determining a region of the regions, wherein the information element is within the region;

determining, among the information elements within the region, a maximum value of the parameter;

determining, among the information elements within the region, a minimum value of the parameter;

subtracting the minimum value from the value of the parameter of the information element to yield a first difference;

subtracting the minimum value from the maximum value to yield a second difference;

dividing a dynamic range of values of the parameter associated with the second representation system by the second difference to yield a quotient;

multiplying the quotient by the first difference to yield a product;

adding the product to one half to yield a sum; and rounding the sum to a nearest integer that is less than or equal to the sum to yield a remapped value of the parameter of the information element.

8. The method of claim 7, wherein the second difference is raised to a power before the dividing the dynamic range of values of the parameter associated with the second representation system by the second difference, the first difference is raised to the power before the multiplying the quotient by the first difference, a function is determined before the adding the product to one half to yield the sum, and the product is a variable of the function.

9. The method of claim 7, wherein the information element is a pixel.

10. The method of claim 9, wherein the collection of information elements is an image frame.

11. The method of claim 7, further comprising performing, for each remaining information element within the region, the subtracting the minimum value from the value of the parameter of the information element, the subtracting the minimum value from the maximum value, the dividing the dynamic range of values of the parameter associated with the second representation system by the second difference, the multiplying the quotient by the first difference, the adding, and the rounding.

12. The method of claim 11, further comprising performing, for each remaining region of the regions, the determining, among the information elements within the region, the maximum value of the parameter and the determining, among the information elements within the region, the minimum value of the parameter to yield a collection of maximum values and a collection of minimum values.

13. The method of claim 12, further comprising performing, for each information element within the each remaining region, the subtracting the minimum value from the value of the parameter of the information element, the subtracting the minimum value from the maximum value, the dividing the dynamic range of values of the parameter associated with the second representation system by the second difference, the multiplying the quotient by the first difference, the adding, and the rounding.

14. The method of claim 13, further comprising encoding the regions to yield encoded regions.

15. The method of claim 14, further comprising transporting the encoded regions, the collection of maximum values, and the collection of minimum values.

16. The method of claim 13, further comprising decoding the regions.

17. A method for remapping a value of a parameter of an information element from a first representation system to a second representation system, comprising:

dividing a dynamic range of values of the parameter associated with the second representation system by a dynamic range of values of the parameter associated with the first representation system to yield a quotient;

multiplying the quotient by the value of the parameter of the information element to yield a product;

adding the product to one half to yield a sum; and rounding the sum to a nearest integer that is less than or equal to the sum to yield a remapped value of the parameter of the information element.

18. An apparatus for remapping a value of a parameter of an information element from a first representation system to a second representation system, comprising:

a receiver configured to receive a collection of information elements; and a processor configured to divide the collection of information elements into regions, to determine a region of the regions, wherein the information element is within the region, to determine, among the information elements within the region, a maximum value of the parameter, to determine, among the information elements within the region, a minimum value of the parameter, to subtract the minimum value from the value of the parameter of the information element to yield a first difference, to subtract the minimum value from the maximum value to yield a second difference, to divide a dynamic range of values of the parameter associated with the second representation system by the second difference to yield a quotient, to multiply the quotient by the first difference to yield a product, to add the product to one half to yield a sum, and to round the sum to a nearest integer that is less than or equal to the sum to yield a remapped value of the parameter of the information element.

19. The apparatus of claim 18, wherein the processor is further configured to raise the second difference to a power before dividing the dynamic range of values of the parameter associated with the second representation system by the second difference, to raise the first difference to the power before multiplying the quotient by the first difference, and to determine a function before adding the product to one half to yield the sum, wherein the product is a variable of the function.

20. The apparatus of claim 18, further comprising an encoder configured to encode the regions to yield encoded regions.

21. The apparatus of claim 20, further comprising a transporter configured to transport the encoded regions, a collection of maximum values, and a collection of minimum values.

22. The apparatus of claim 18, further comprising a decoder configured to decode the regions.

23. An apparatus for remapping a value of a parameter of an information element from a first representation system to a second representation system, comprising a processor configured to divide a dynamic range of values of the parameter associated with the second representation system by a dynamic range of values of the parameter associated with the first representation system to yield a quotient, to multiply the quotient by the value of the parameter of the information element to yield a product, to add the product to one half to yield a sum, and to round the sum to a nearest integer that is less than or equal to the sum to yield a remapped value of the parameter of the information element.

*24. In a system for encoding an information stream, a method comprising:*

*dividing the information stream into a plurality of information regions;*

*identifying, for at least one of the plurality of information regions, a maximal value and a minimal value of at least one information element associated with the least one of the plurality of information regions;*

*mapping the at least one information element according to the identified maximal and minimal values associated with the respective information region, wherein said mapping comprises determining a target information element as a function of an original information element, a target range, and said maximal and minimal values, wherein the difference between the maximal and minimal values is used to map the original information element to the target range to generate a mapped information element;*

*encoding the mapped information element to produce an encoded information stream; and*

*associating said identified maximal and minimal values with the at least one of the plurality of information regions to produce a map identification stream, wherein said map identification stream includes information sufficient to substantially recover said identified maximal and minimal values associated with said mapped at least one information element.*

*25. The method of claim 24, wherein said mapping further comprises using a combination of linear and non-linear functions.*

*26. The method of claim 24, wherein said mapping further comprises using a polynomial segment.*

*27. The method of claim 24, wherein said mapping further comprises using a tabulated function comprising an indexable array of values.*

*28. A method for encoding an information stream, said method comprising:*

*receiving a plurality of information frames, each of said plurality of information frames comprising a plurality of information elements, each of said plurality of information elements associated with at least one information element parameter, each of the at least one information element parameters having a value between a lower limit and an upper limit, said upper and lower limits defining a dynamic range of said at least one information element parameter;*

*defining, for each of the plurality of information frames, a plurality of information regions, each of the plurality of information regions being associated with one or more respective information elements;*

*identifying, for each of the plurality of information regions, a maximal value and a minimal value of at least one information element parameter associated with said plurality of information elements of said region;*

*remapping, for each of said plurality of information regions, the at least one information element parameter of each of said plurality of information elements of said region according to the identified maximal and minimal value parameters associated with the respective region, wherein the difference between the maximal and minimal value parameters is used to remap the at least one of said plurality of information element parameters to a target range;*

*encoding each remapped information region of said plurality of information regions to produce an encoded information stream; and*

*associating said identified maximal and minimal values with each remapped information region of said plurality of information regions to produce a map identification stream, wherein said map identification stream includes information sufficient to substantially recover said identified maximal and minimal value parameters associated with said remapped at least one information element parameter for each of said plurality of information regions.*

*29. A method for encoding an information stream comprising a plurality of information frames, said method comprising:*

*receiving the plurality of information frames;*

*for at least one of the plurality of information frames, dividing the at least one of the plurality of information frames into regions according to at least one criterion for rescaling a range of one or more parameters of interest for at least one of the regions as compared to a range of the one or more parameters of interest of the at least one of the plurality of information frames;*

*identifying a target range for said one or more parameters of interest, the target range being different from the range of the one or more parameters of interest; and*

*remapping, for at least one of said regions, the one or more parameters of interest to the identified target range, the remapped parameters being bounded by the target range.*

*30. The method of claim 29, further comprising encoding the remapped regions to produced a compressed information stream.*

*31. The method of claim 30, further comprising multiplexing the encoded remapped regions with information for recovering the regions.*

* * * * *

UNITED STATES PATENT AND TRADEMARK OFFICE

CERTIFICATE OF CORRECTION

PATENT NO. : RE43,647 E
APPLICATION NO. : 12/841862
DATED : September 11, 2012
INVENTOR(S) : Reitmeier et al.

It is certified that error appears in the above-identified patent and that said Letters Patent is hereby corrected as shown below:

On the Title Page

On Page 2, Item (56), under "FOREIGN PATENT DOCUMENTS", in Column 1, Line 2, delete "4/1995" and insert -- 6/1995 --, therefor.

On Page 2, Item (56), under "FOREIGN PATENT DOCUMENTS", in Column 2, Line 1, delete "WO WO97/17669 5/1997".

On Page 2, Item (56), under "FOREIGN PATENT DOCUMENTS", in Column 2, Line 5, delete "WO WO99/37097 7/1999".

On Page 2, Item (56), under "FOREIGN PATENT DOCUMENTS", in Column 2, Line 7, delete "WO WO00/64185 10/2000".

On Page 2, Item (56), under "OTHER PUBLICATIONS", in Column 2, Lines 1-3, delete "Chen, et al.: "Coding of Subregions.....Feb. 1, 1997, pp. 256-260.".

In the Specifications

In Column 2, Line 55, delete "DRAWING" and insert -- DRAWINGS --, therefor.

In Column 6, Line 10, delete "form" and insert -- from --, therefor.

In Column 8, Line 8, delete "then" and insert -- than --, therefor.

In the Claims

In Column 18, Line 55, in Claim 30, delete "produced" and insert -- produce --, therefor.

Signed and Sealed this
Seventeenth Day of December, 2013

Margaret A. Focarino

Margaret A. Focarino
*Commissioner for Patents of the United States Patent and Trademark Office*